US011857930B2

United States Patent
Kawano et al.

(10) Patent No.: US 11,857,930 B2
(45) Date of Patent: Jan. 2, 2024

(54) CRYSTALLIZATION APPARATUS AND CRYSTALLIZATION METHOD

(71) Applicant: JGC Japan Corporation, Yokohama (JP)

(72) Inventors: Masahiro Kawano, Yokohama (JP); Naoki Tahara, Yokohama (JP)

(73) Assignee: JGC Corporation, Yokohama (JP)

( * ) Notice: Subject to any disclaimer, the term of this patent is extended or adjusted under 35 U.S.C. 154(b) by 441 days.

(21) Appl. No.: 17/043,088

(22) PCT Filed: Jun. 14, 2018

(86) PCT No.: PCT/JP2018/022767
§ 371 (c)(1),
(2) Date: Sep. 29, 2020

(87) PCT Pub. No.: WO2019/239550
PCT Pub. Date: Dec. 19, 2019

(65) Prior Publication Data
US 2021/0362073 A1    Nov. 25, 2021

(51) Int. Cl.
*B01D 9/02*    (2006.01)
*B01D 9/00*    (2006.01)

(52) U.S. Cl.
CPC ......... *B01D 9/0054* (2013.01); *B01D 9/0013* (2013.01); *B01D 9/0036* (2013.01);
(Continued)

(58) Field of Classification Search
CPC .. B01D 9/0054; B01D 9/0013; B01D 9/0036; B01D 9/0059; B01D 9/0081; B01D 2009/0086

See application file for complete search history.

(56) References Cited

U.S. PATENT DOCUMENTS 7,811,381 B2    10/2010    Sirkar
2009/0114089 A1*   5/2009   Liu .................. B01D 71/028
                                                    502/4
(Continued)

FOREIGN PATENT DOCUMENTS

JP    2006-524565 A    11/2006
JP    2009-297668 A    12/2009
JP    2011-509173 A    3/2011

OTHER PUBLICATIONS

Kenichiro Sotowa; "Continuous Crystallization of Organic Compounds in MicroChannels", Chemical Engineering, The Society of Chemical Engineers, Japan, 2015, vol. 79, No. 12, p. 909-911.
(Continued)

*Primary Examiner* — Robert M Kunemund
(74) *Attorney, Agent, or Firm* — Jordan and Koda, PLLC; Steven P. Koda

(57) ABSTRACT

Provided is a technique for continuously performing poor solvent crystallization or reactive crystallization. A porous membrane in which multiple pores through which a liquid passes are formed internally partitions the treatment container into a first flow space and a second flow space. A raw material liquid supply unit continuously supplies a raw material liquid to the first flow space. A treatment liquid supply unit continuously supplies a treatment liquid to the second flow space at a pressure at which the treatment liquid passes through the porous membrane and enters the first flow space. An extraction unit continuously extracts a mixed liquid of the raw material liquid and the treatment liquid from the first flow space. An aging unit precipitates and grows crystals of a target substance from a mixed liquid.

26 Claims, 13 Drawing Sheets

(52) U.S. Cl.
CPC ......... *B01D 9/0059* (2013.01); *B01D 9/0081* (2013.01); *B01D 2009/0086* (2013.01)

(56) References Cited

U.S. PATENT DOCUMENTS

| | | | |
|---|---|---|---|
| 2012/0240763 A1* | 9/2012 | Liu | B82Y 30/00 502/4 |
| 2014/0256984 A1 | 9/2014 | Myerson et al. | |
| 2016/0166512 A1 | 6/2016 | Sirkar et al. | |

OTHER PUBLICATIONS

English translation of Kenichiro Sotowa "Continuous Crystallization of Organic Compounds in MicroChannels", Chemical Engineering, The Society of Chemical Engineers, Japan, 2015, vol. 79, No. 12, p. 909-911.

* cited by examiner

CRYSTALLIZATION APPARATUS AND CRYSTALLIZATION METHOD

BACKGROUND OF THE INVENTION

The present invention relates to a technique for continuously obtaining crystals of a target substance from a raw material liquid.

In processes for manufacturing fine chemicals such as pharmaceuticals, crystallization is used as a method for obtaining crystals of a target substance from a raw material liquid.

For example, in poor solvent crystallization, a poor solvent that lowers the solubility of a target substance is mixed with a raw material liquid in which the target substance is dissolved and crystals of the target substance are precipitated in the obtained mixed liquid. In addition, in reactive crystallization, crystals of a target substance are precipitated by mixing of a raw material liquid containing a raw material substance with a reaction liquid generating a target substance with lower solubility by reacting with the raw material substance.

In the related art, a batch-type process has been employed for poor solvent crystallization (the same applies to reactive crystallization although only the poor solvent crystallization will be referred to below for convenience of description). In the process, a poor solvent is dripped with respect to a raw material liquid contained in a treatment container and crystals of a target substance are obtained in the treatment container.

However, the batch-type process is likely to cause an increase in production cost due to complicated switching operation such as raw material liquid preparation and discharge of a crystal-precipitated mixed liquid.

For example, Non-Patent Document 1 refers as the related art to a mixed suspension mixed product removal (MSMPR) process in which slurry (mixed liquid) completely mixed in a stirring tank is extracted. However, MSMPR is problematic in that crystal size distribution is likely to widen, it is difficult to obtain high-concentration crystals, and blockage and crystal adhesion are likely to occur.

Also described in Non-Patent Document 1 is a microreactor in which a raw material liquid and a poor solvent are mixed in the pipeline of a micro flow path having a pipe diameter of approximately 1 mm. On the other hand, it is required from a commercial perspective to realize continuous crystallization in which an increase in treatment amount is possible.

CITATION LIST

Non-Patent Document

Non-Patent Document 1: "Continuous Crystallization of Organic Compounds in MicroChannels", Chemical Engineering, The Society of Chemical Engineers, Japan, 2015, Vol. 79, No. 12, p. 909-911

SUMMARY OF THE INVENTION

The invention has been made under such a background and provides a technique for continuously performing poor solvent crystallization or reactive crystallization.

A crystallization apparatus of the invention includes:
a treatment container where treatment for precipitating a crystal of a target substance is performed;
a porous membrane provided so as to internally partition the treatment container into a first flow space and a second flow space, multiple pores through which a liquid passes being formed in the porous membrane;
a raw material liquid supply unit continuously supplying the first flow space with a raw material liquid containing the target substance or a raw material substance as a raw material of the target substance;
a treatment liquid supply unit continuously supplying a treatment liquid to the second flow space at a pressure at which the treatment liquid passes through the porous membrane and enters the first flow space, the treatment liquid being a poor solvent lowering solubility of the target substance with respect to a mixed liquid obtained by mixing with the raw material liquid or a reaction liquid generating a target substance lower in solubility with respect to the mixed liquid than the raw material substance by reacting with the raw material substance;
an extraction unit continuously extracting a mixed liquid of the raw material liquid and the treatment liquid from the first flow space; and
an aging unit precipitating and growing a crystal of the target substance from a mixed liquid extracted from the extraction unit.

The crystallization apparatus may have the following features.

(a) The aging unit includes a pipeline allowing a mixed liquid extracted from the extraction unit to flow.

(b) Each of the raw material liquid supply unit and the treatment liquid supply unit is provided at a position where the raw material liquid or the treatment liquid is supplied from an upper portion side of the treatment container and the extraction unit is provided at a position where the mixed liquid is extracted from a lower portion side of the treatment container. Alternatively, each of the raw material liquid supply unit and the treatment liquid supply unit is provided at a position where the raw material liquid or the treatment liquid is supplied from a lower portion side of the treatment container and the extraction unit is provided at a position where the mixed liquid is extracted from an upper portion side of the treatment container.

(c) The crystallization apparatus includes:
a gas-liquid separation unit provided at a position higher than the first flow space and the second flow space and including a container for collecting an air bubble brought in together with the raw material liquid or treatment liquid and separating the air bubble from a liquid;
a sensor unit detecting a height of an interface between a liquid and a gas pool formed by an air bubble being separated from a liquid in the gas-liquid separation unit; and
an exhaust unit discharging gas of the gas pool in a case where an interface height detected by the sensor unit is equal to or lower than a preset interface height.

(d) A plurality of sets of crystallization modules are connected in series when a set of the treatment container provided with the porous membrane, the raw material liquid supply unit, the treatment liquid supply unit, the extraction unit, and the aging unit is called the crystallization module, and a mixed liquid flowing out of an aging unit of a crystallization module of a set upstream by one instead of the raw material liquid supply unit with a precipitated crystal removed is supplied as a raw material liquid in the crystallization module connected in series in a second or subsequent set.
(e) The crystallization apparatus includes a cooling unit cooling the mixed liquid. The cooling unit is provided in the aging unit at this time.
(f) The crystallization apparatus includes a mixing promotion unit promoting mixing of a mixed liquid flowing in the first flow space.
(g) The poor solvent contains a fine crystal of the target substance capable of passing through a pore of the porous membrane. Alternatively, the raw material liquid contains a fine crystal of the target substance.

According to the invention, the treatment liquid is mixed via the porous membrane with the raw material liquid flowing through the first flow space in the treatment container, and thus crystals of the target substance can be precipitated in the mixed liquid continuously extracted from the treatment container.

DETAILED DESCRIPTION OF PREFERRED EMBODIMENTS

Hereinafter, an embodiment of a crystallization apparatus continuously performing poor solvent crystallization will be described with reference to the drawings.

Figure 1:
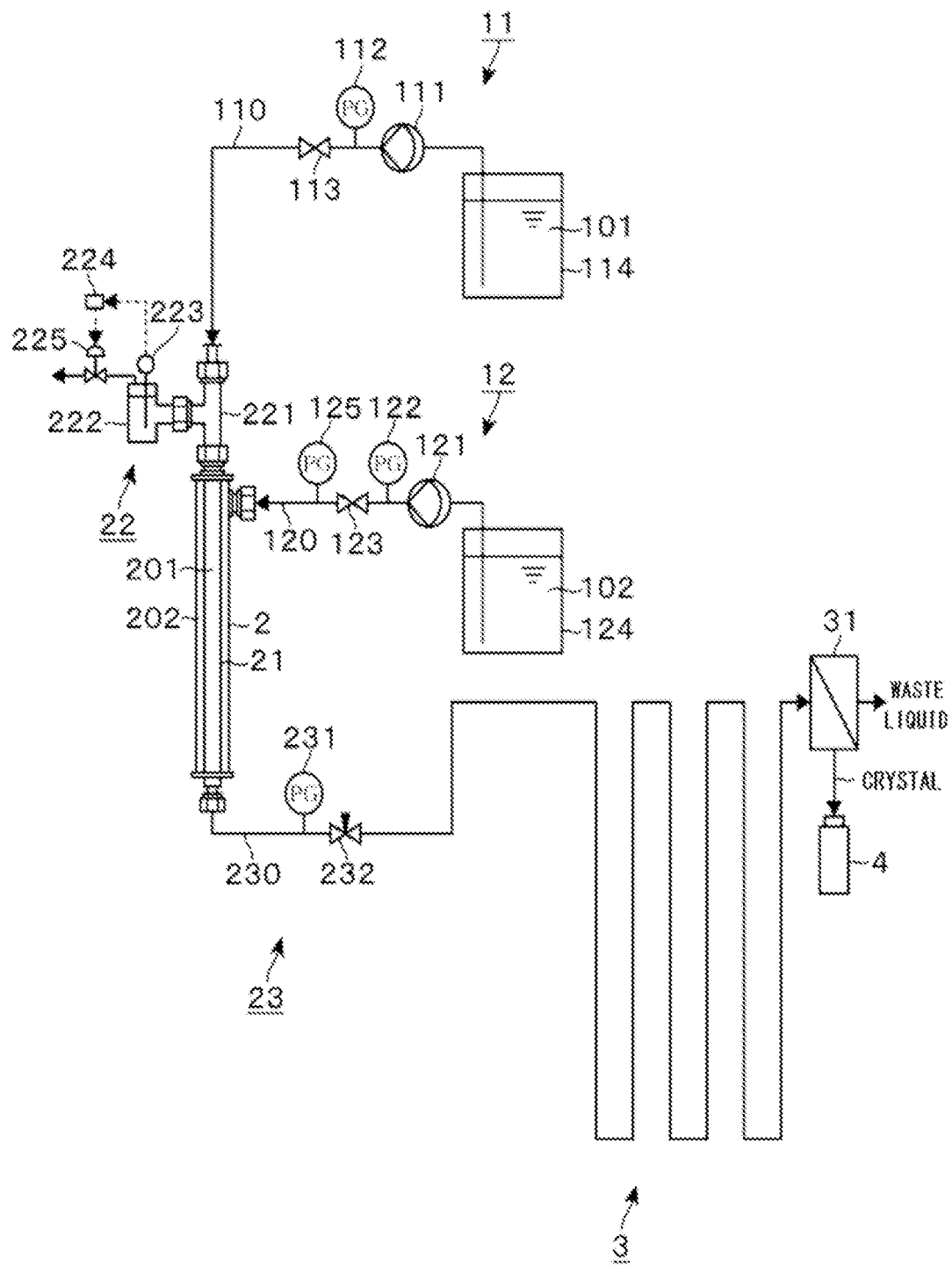
FIG. 1 is a configuration diagram of a crystallization apparatus according to an embodiment.

FIG. 1 is a configuration example of a downflow-type crystallization apparatus in which a raw material liquid is supplied from the upper portion side of a treatment container 2 and a mixed liquid obtained by a poor solvent being mixed with the raw material liquid is extracted from the lower portion side of the treatment container 2.

The crystallization apparatus of this example includes a raw material liquid supply unit 11 that supplies a raw material liquid 101, a poor solvent supply unit (treatment liquid supply unit) 12 that supplies a poor solvent 102, which is a treatment liquid, the treatment container 2 in which the raw material liquid 101 and the poor solvent 102 are mixed, and an aging unit that precipitates and grows crystals of a target substance from the mixed liquid extracted from the treatment container 2.

The raw material liquid supply unit 11 includes a raw material liquid tank 114 storing the raw material liquid 101 and a raw material liquid supply line 110 for supplying the raw material liquid 101 extracted from the raw material liquid tank 114 to the treatment container 2. On the raw material liquid supply line 110, a diaphragm pump 111, a pressure gauge 112, and an opening-closing valve 113 are provided in this order from the upstream side.

The poor solvent supply unit 12 includes a poor solvent tank 124 storing the poor solvent 102 and a poor solvent supply line 120 for supplying the poor solvent 102 extracted from the poor solvent tank 124 to the treatment container 2. On the poor solvent supply line 120, a diaphragm pump 121, a pressure gauge 122, an opening-closing valve 123, and a pressure gauge 125 for monitoring the pressure in the treatment container 2 are provided in this order from the upstream side.

Figure 2:
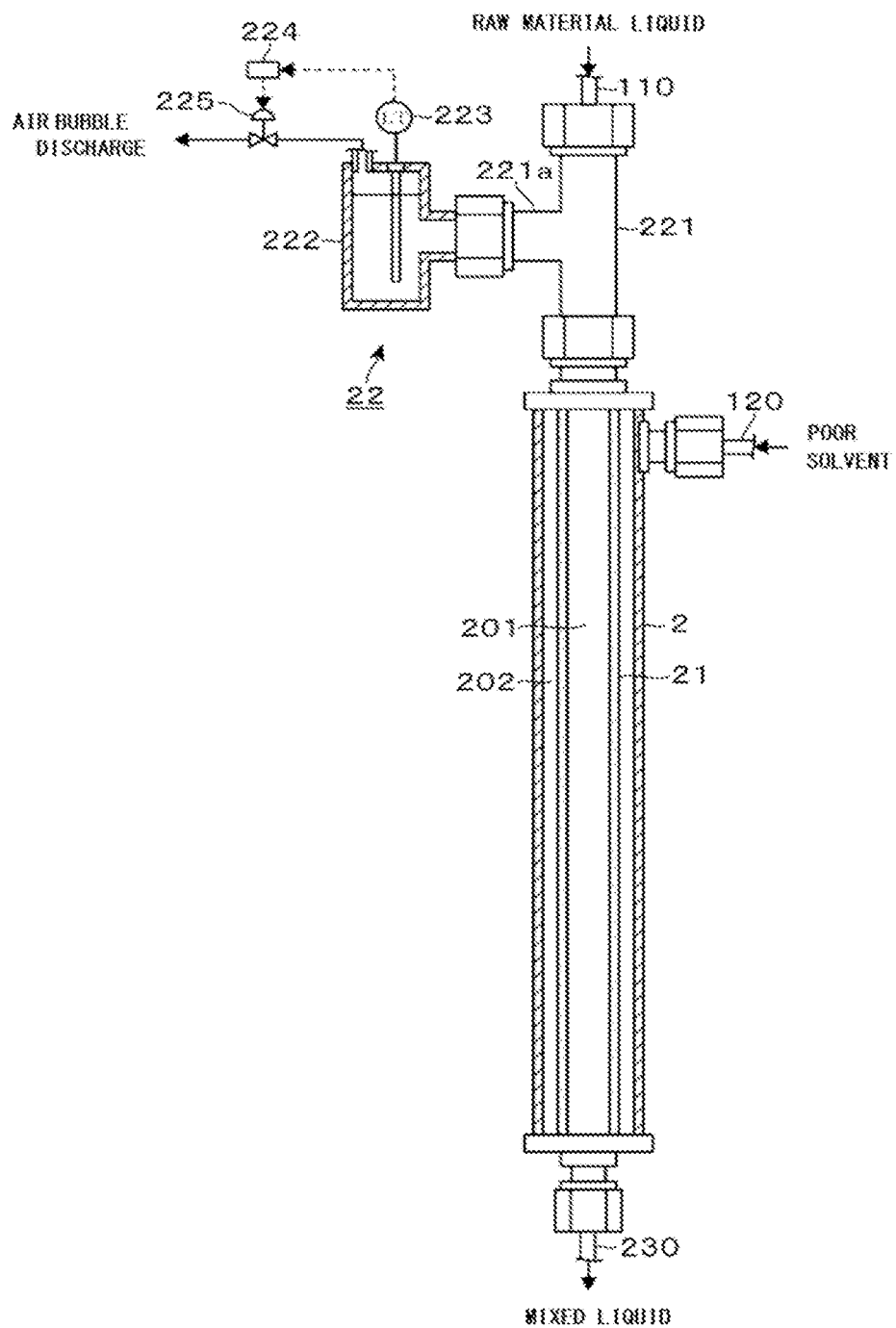
FIG. 2 is a vertical cross-sectional side view of a treatment container provided in the crystallization apparatus.

The treatment container 2 is made of, for example, a straight pipe and is disposed with a pipe axis vertically oriented. As illustrated in FIGS. 1 and 2, the raw material liquid supply line 110 has a terminal end portion connected to the upper end portion of the treatment container 2 via an exhaust unit 22 (described later). On the other hand, the poor solvent supply line 120 has a terminal end portion connected to a side surface on the upper portion side of the treatment container 2.

A porous membrane 21 smaller in diameter than the treatment container 2 and molded in a straight pipe shape is disposed in the treatment container 2 of this example. The porous membrane 21 partitions the space in the treatment container 2 into a first flow space 201 inside the porous membrane 21 and a second flow space 202 between the inner peripheral surface of the treatment container 2 and the outer peripheral surface of the porous membrane 21.

The raw material liquid 101 supplied from the raw material liquid supply line 110 flows into the upper portion side of the first flow space 201. The poor solvent 102 supplied from the poor solvent supply line 120 flows into the upper portion side of the second flow space 202.

Porous membranes made of various materials such as porous glass, porous ceramics, and porous polymers can be used as the porous membrane 21. For example, a porous membrane having an average pore diameter in the range of 0.01 to 50 μm can be used as the porous membrane 21. In addition, more preferably, a porous membrane having an average pore diameter of 0.01 to 10 μm is used as the porous membrane 21. The pore diameter distribution of the porous membrane 21 can be measured by, for example, a mercury penetration method or a gas adsorption method.

The porous membrane 21 having the above-described configuration plays a role of mixing the raw material liquid and the poor solvent by allowing the poor solvent supplied to the second flow space 202 side to pass to the first flow space 201 side via the multiple pores that are formed in the porous membrane 21.

The pressure gauge 125 provided on the downstream side of the opening-closing valve 123 on the poor solvent supply line 120 is used in order to keep the pressure of the second flow space 202 higher than the pressure of the first flow space 201 in view of the pressure loss of the porous membrane 21. By managing the pressure of the second flow space 202, it is possible to prevent raw material liquid backflow from the first flow space 201 side to the second flow space 202 side.

It should be noted that the porous membrane 21 that has an average pore diameter of more than 50 μm can also be used in a case where the concentration distribution of the poor solvent that will be described later with reference to FIG. 3 can be formed. A sintered metal can be exemplified as a material that the porous membrane 21 is made of.

Next, the configuration of the exhaust unit 22 will be described. In some cases, air bubbles brought in together with the liquid (raw material liquid 101 or poor solvent 102) from the raw material liquid supply line 110 or the poor solvent supply line 120 accumulate in the treatment container 2 and form a gas pool. In this case, the part of the porous membrane 21 that is in contact with the gas pool is incapable of exhibiting the function of mixing the raw material liquid and the poor solvent. In this regard, the gas that has been brought into the treatment container 2 is discharged to the outside by means of the exhaust unit 22.

As illustrated in FIG. 2, the exhaust unit 22 includes a T-shaped connection 221 that connects the downstream end portion of the raw material liquid 101 and the upper end portion of the treatment container 2, a gas-liquid separation unit 222 that is a container connected to a branch pipe 221a branching from the side surface of the T-shaped connection 221, a liquid level gauge 223 that is a sensor unit measuring the liquid level in the gas-liquid separation unit 222 (height of the interface between the gas pool and the liquid), and a valve controller 224 that opens and closes a degassing valve 225 based on the result of the liquid level detection by the liquid level gauge 223.

The gas-liquid separation unit 222 is provided at a position higher than the first flow space 201 and the second flow space 202. The liquid level gauge 223 is made of, for example, an ultrasonic level sensor. The valve controller 224 is configured to open the degassing valve 225 and discharge the gas of the gas pool to the outside in a case where the liquid level detected by the liquid level gauge 223 has become equal to or lower than a preset liquid level.

Returning to the description of the treatment container 2 side, an extraction line 230 for continuously extracting the mixed liquid of the raw material liquid 101 and the poor solvent 102 from the first flow space 201 is connected to the lower end portion of the treatment container 2. On the extraction line 230, a pressure gauge 231 and a needle valve 232 are provided in order from the upstream side. The extraction line 230, the pressure gauge 231, and the needle valve 232 correspond to an extraction unit 23 of this example.

The pipeline of the extraction line 230 on the downstream side of the needle valve 232 constitutes an aging pipe (aging unit) 3 through which the mixed liquid flows until the crystals of the target substance precipitate from the mixed liquid of the raw material liquid and the poor solvent (induction time) and until the crystals precipitated from the mixed liquid grow to a desired crystal diameter.

Figure 6:
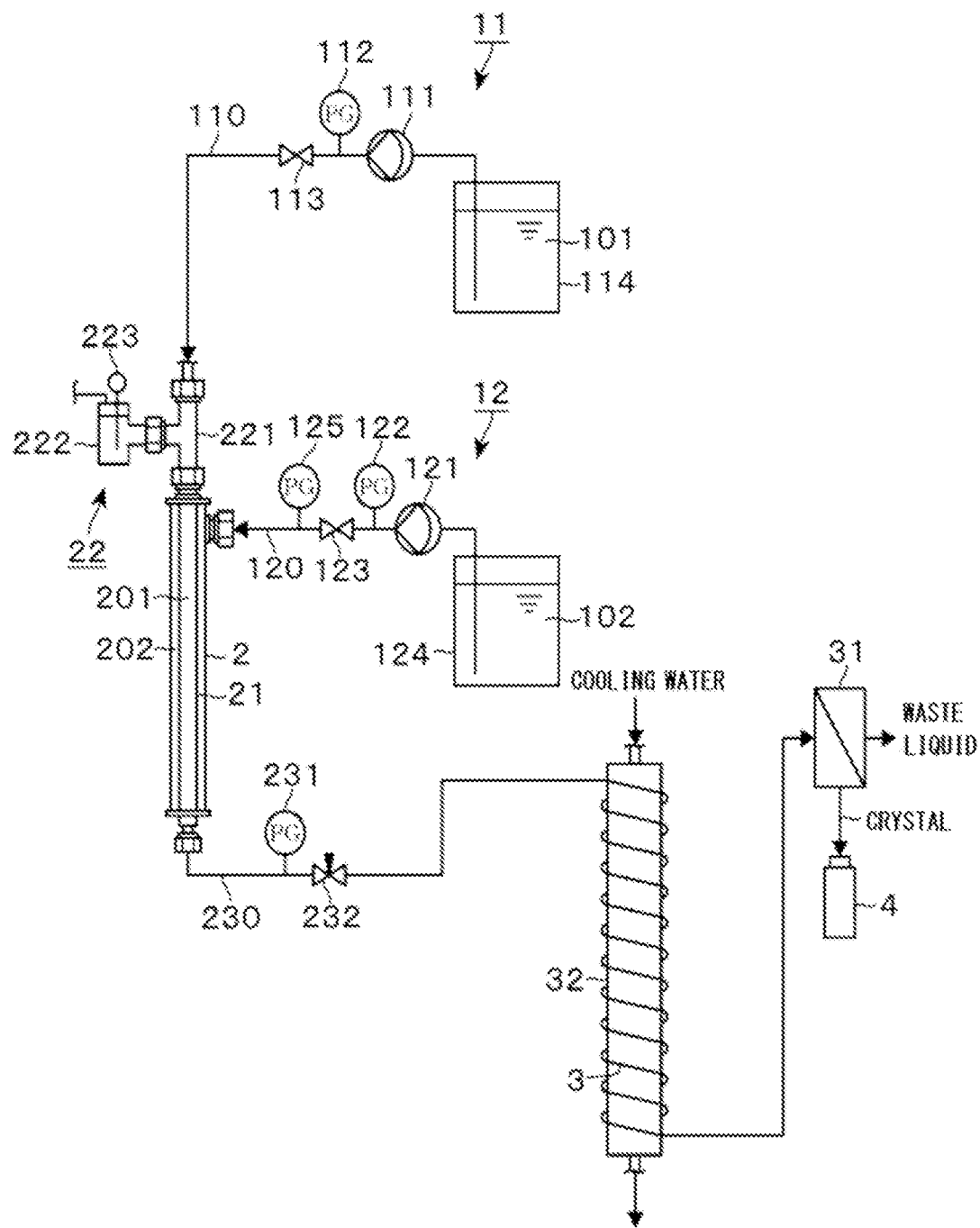
FIG. 6 is a configuration diagram of a crystallization apparatus including a cooling unit.

Although not particularly limited, the length of the aging pipe 3 is set to, for example, approximately tens of centimeters to approximately tens of meters based on the flow rate of the mixed liquid and the induction time or the time required for the crystal growth. Although the aging pipe 3 that is disposed in a meandering manner is illustrated in FIG. 1, the aging pipe 3 may be wound around, for example, a cylindrical holding member (see the winding of the aging pipe 3 around a cooling unit 32 that is illustrated in FIG. 6 and will be described later).

Provided in the downstream end portion of the aging pipe 3 is a solid-liquid separation unit 31 that is configured by, for example, an aspirator and a filter for solid-liquid separation being combined and is for separating the mixed liquid into crystals and waste liquid.

The action of the crystallization apparatus having the configuration described above will be described.

First, the opening-closing valve 113 is opened, the diaphragm pump 111 is driven, and the raw material liquid 101 in the raw material liquid tank 114 is continuously supplied to the treatment container 2 at a predetermined flow rate. In parallel with this operation, the opening-closing valve 123 is opened, the diaphragm pump 121 is driven, and the poor solvent 102 in the poor solvent tank 124 is continuously supplied to the treatment container 2 at a predetermined flow rate.

The raw material liquid 101 supplied from the raw material liquid supply unit 11 flows in the first flow space 201 from the upper portion side toward the lower portion side (along one surface side of the porous membrane 21). In addition, the poor solvent 102 supplied from the poor solvent supply unit 12 flows in the second flow space 202 from the upper portion side toward the lower portion side (along the opposite surface side that is opposite to the one surface side of the porous membrane 21). Further, by the supply pressure from the poor solvent supply unit 12 being adjusted so as to be higher than the pressure loss of the porous membrane 21, the poor solvent 102 flowing in the second flow space 202 passes through the porous membrane 21 from each position on the outer surface of the porous membrane 21 and flows into the first flow space 201 (see the dashed arrow in FIG. 3).

Here, since the pore diameter distribution of the porous membrane 21 is uniform in the surface of the porous membrane 21, the poor solvent 102 flows into the first flow space 201 at substantially the same flow velocity from each position in the surface of the porous membrane 21. As a result, as also illustrated in FIG. 3, a concentration distribution is formed in which the average concentration of the poor solvent 102 in the mixed liquid at each height position continuously increases from the upper portion side of the first flow space 201 toward the lower portion side of the first flow space 201 (FIG. 3 illustrates an example in which the concentration of the poor solvent increases proportionally).

On the other hand, in the MSMPR process of the related art in which the poor solvent 102 is dripped and mixed with the raw material liquid 101 by means of a stirring blade or the like, there may be a case where a region where the poor solvent 102 has a high concentration is locally formed at the position of the dripping and it is difficult to form crystals of uniform size. In this regard, it becomes difficult to increase the amount of treatment if the amount of dripping of the poor solvent 102 is reduced so that the formation of such a high-concentration region is suppressed.

In this respect, the poor solvent 102 is uniformly supplied from each position in the surface of the porous membrane 21 in the crystallization apparatus of this example, and thus a supply amount distribution in which the supply amount of the poor solvent increases only in a local region in the surface of the porous membrane 21 is unlikely to be formed. Used in this example in particular is a porous membrane having an average pore diameter in the range of 0.01 to 50 μm and more preferably having an average pore diameter of 0.01 to 10 μm. By using the porous membrane 21 having such characteristics, it is possible to suppress local supply of a large amount of poor solvent as compared with the porous membrane 21 that includes relatively large pores, and thus it is possible to precisely control the crystal diameter of the target substance or the like.

In this manner, the raw material liquid 101 supplied from the upper portion of the first flow space 201 and the poor solvent 102 that has passed through the porous membrane 21 are mixed and the mixed liquid in which the solubility of the target substance is lowered is continuously extracted from the lower portion side of the first flow space 201 to the extraction line 230. It should be noted that the raw material liquid 101 may contain fine crystals (seed crystals) of the target substance.

Here, some time needs to elapse until the initiation of the precipitation of the crystals of the target substance after the concentration of the target substance in the mixed liquid reaches saturation as a result of the mixing of the poor solvent and this time is called induction time. For example, in a case where the induction time is short, crystals may precipitate in the mixed liquid in the first flow space 201. Crystals can be easily discharged out of the first flow space 201 even in such a case since a downflow in which the mixed liquid flows from the upper portion side toward the lower portion side is formed in the first flow space 201.

In addition, as for the action of the exhaust unit 22, air bubbles rise in the treatment container 2 and the T-shaped connection 221 and flow into the gas-liquid separation unit 222 even in a case where the air bubbles have been brought in together with the raw material liquid 101 from the raw material liquid supply line 110. In addition, in a case where air bubbles have been brought into the second flow space 202 together with the poor solvent 102 from the poor solvent supply line 120, the air bubbles pass through the porous membrane 21, flow into the first flow space 201, and then flow into the gas-liquid separation unit 222.

The valve controller 224 executes the operation of opening the degassing valve 225 once a gas pool is formed in the gas-liquid separation unit 222 in this manner and the liquid level detected by the liquid level gauge 223 becomes equal to or lower than a preset level. As a result, the gas accumulated in the gas-liquid separation unit 222 is discharged to the outside, and thus it is possible to suppress gas pool formation in the treatment container 2 and mix the raw material liquid 101 and the poor solvent 102 by using the entire surface of the porous membrane 21.

The mixed liquid that has flowed out of the treatment container 2 passes through the needle valve 232 provided on the extraction line 230 and flows into the aging pipe 3 side. A case where the needle valve 232 is blocked by the crystals of the target substance precipitated in the first flow space 201 at this time is detected as a rise in the pressure of the pressure gauge 231, and thus it is possible to avoid damage to the equipment by stopping the diaphragm pumps 111 and 121 in that case.

The induction time elapses in the process of the mixed liquid that has flowed into the aging pipe 3 flowing in the aging pipe 3 and the crystals of the target substance precipitate and grow. It should be noted that the crystals may be small to the point of being invisible after the elapse of the induction time. Accordingly, it may be difficult to pinpoint where the induction time elapses among the first flow space 201, the extraction line 230, and the aging pipe 3. In this respect, in the crystallization apparatus of this example, it can be said that the aging pipe 3 fulfills the action of "precipitating and growing the crystals of the target substance" insofar as at least the mixed liquid is capable of flowing to the aging pipe 3 side without blocking the needle valve 232 and the crystals can be grown in the aging pipe 3.

The crystals of the target substance precipitated and grown in the aging pipe 3 are separated from the liquid in the solid-liquid separation unit 31 and are contained in a receiving container 4. In addition, the liquid from which the crystals have been separated is treated as waste liquid.

The crystallization apparatus according to the present embodiment has the following effects. The poor solvent 102 is mixed, via the porous membrane 21, with the raw material liquid 101 flowing through the first flow space 201 in the treatment container 2, and thus the crystals of the target substance can be precipitated in the mixed liquid continuously extracted from the treatment container 2.

Here, the operation of "continuously supplying" the raw material liquid 101 and the poor solvent 102 includes not only a case where the liquids 101 and 102 are continuously supplied at a constant flow rate but also a case where supply and stop at a predetermined flow rate and supply amount increase and decrease are intermittently repeated. In addition, the operation of "continuously extracting" the mixed liquid includes not only a case where the mixed liquid is continuously extracted at a constant flow rate but also a case where extraction and stop at a predetermined flow rate and extraction amount increase and decrease are intermittently repeated at regular intervals.

In addition, the aging unit provided in the latter stage of the treatment container is not limited to cases of configuration by means of the aging pipe 3 illustrated in FIG. 1 and so on. For example, a container containing the mixed liquid may be disposed on the downstream side of the needle valve 232 and solid-liquid separation between crystals and waste liquid may be performed after the crystals of the target substance are precipitated and grown by the container being used as an aging unit.

Further, variations of the crystallization apparatus and the treatment container 2 will be described with reference to FIGS. 4 to 10. In FIGS. 4 to 10, components common to the variations and the example described with reference to FIGS. 1 to 3 are denoted by the same reference numerals as those used in the drawings.

Figure 4:
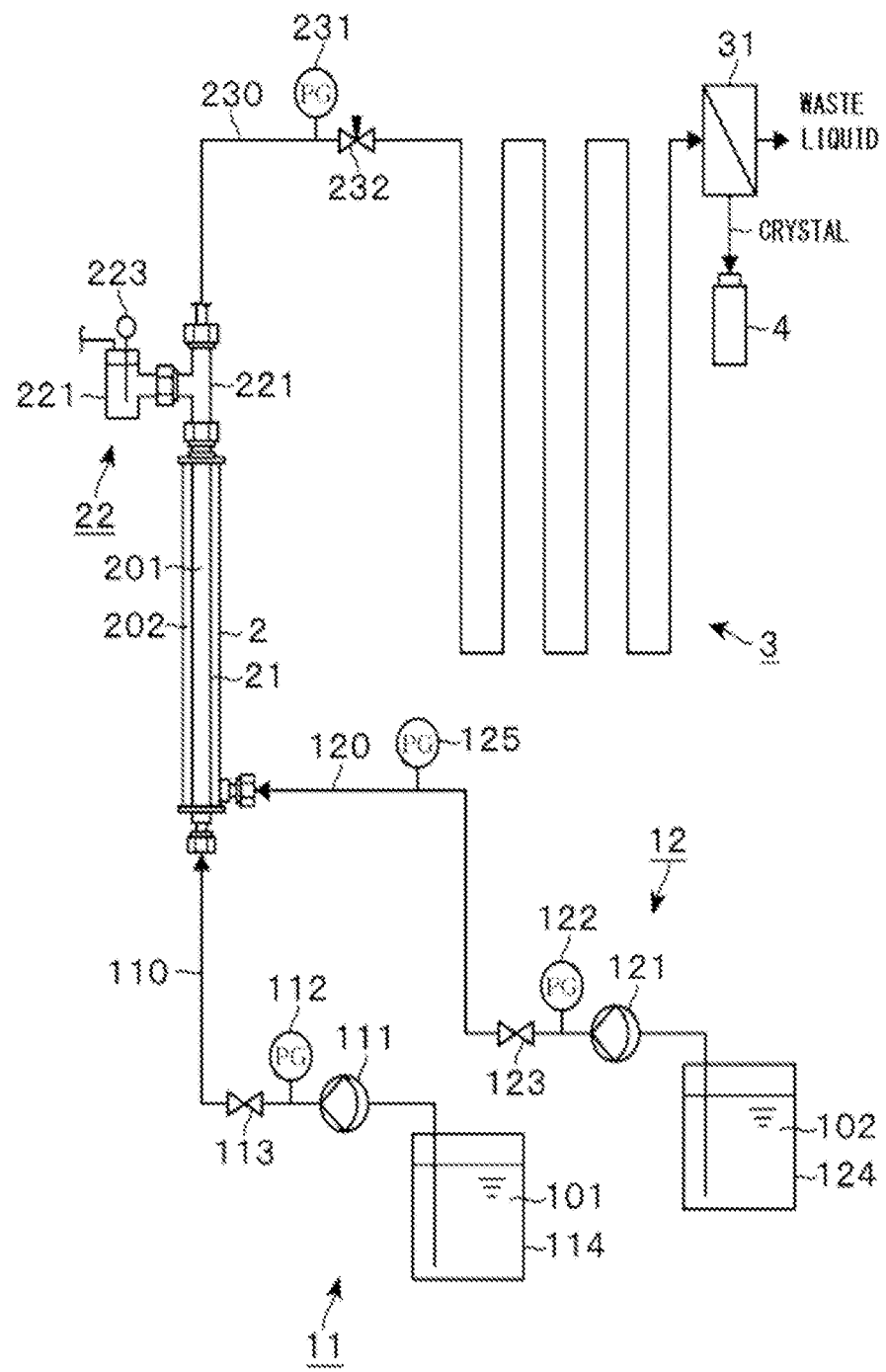
FIG. 4 is a configuration diagram of an upflow-type crystallization apparatus.

FIG. 4 is a configuration example of an upflow-type crystallization apparatus in which the raw material liquid 101 and the poor solvent 102 are supplied from the lower portion side of the treatment container 2 and the mixed liquid is extracted from the upper portion side. In this example, the raw material liquid supply line 110 has a terminal end portion connected to the lower end portion of the treatment container 2 and the poor solvent supply line 120 has a terminal end portion connected to a side surface on the lower portion side of the treatment container 2. On the other hand, the extraction line 230 is connected to the upper end portion of the treatment container 2 (upper end portion of the T-shaped connection 221 in a case where the exhaust unit 22 is provided).

In a case where a liquid (such as ethanol) smaller in specific gravity than the raw material liquid 101 is mixed as the poor solvent 102 with the raw material liquid 101 that is, for example, an aqueous solution containing the target substance, mixing of the raw material liquid 101 and the poor solvent 102 may be facilitated by mixed liquid flow being formed from the lower portion side toward the upper portion side in the first flow space 201. In this regard, the upflow-type crystallization apparatus illustrated in FIG. 4 may be employed in a case where the problem of crystal precipitation and deposition in the first flow space 201 described above is insignificant.

Figure 5:
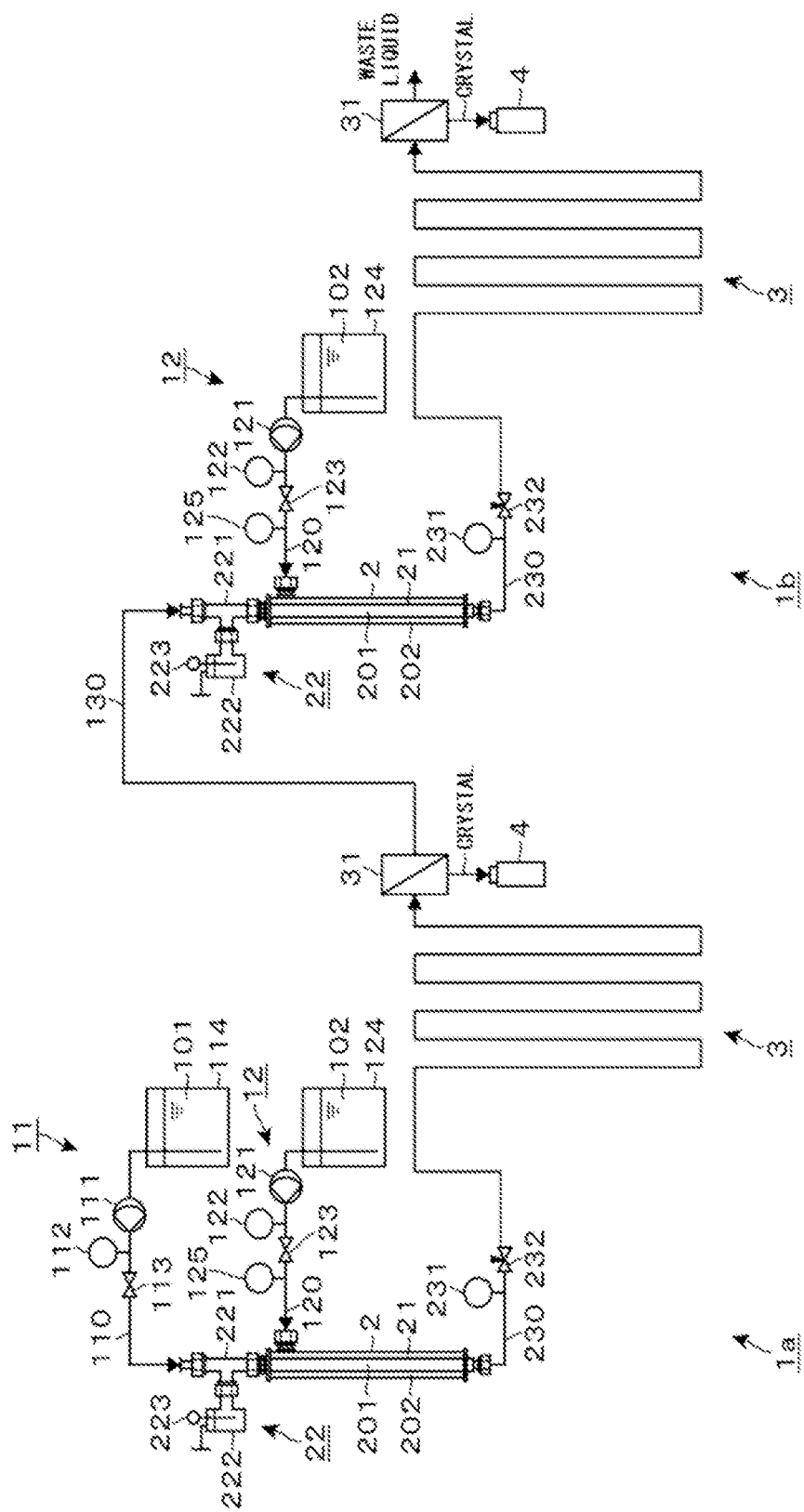
FIG. 5 is a configuration diagram of a serial connection-type crystallization apparatus.

FIG. 5 is a configuration example of a crystallization apparatus in which two sets of crystallization modules 1a and 1b each including a set of the treatment container 2 and the aging pipe 3 are connected in series. In this example, the liquid after the collection of the crystals of the target substance in the upstream-side crystallization module 1a is re-supplied as the raw material liquid 101 to the downstream-side crystallization module 1b via a connection line 130. In the crystallization module 1b, the mixed liquid is obtained by the poor solvent 102 being further mixed with the raw material liquid 101. In other words, in the crystallization module 1b on the latter stage side (second or subsequent set), the mixed liquid that has flowed out of the aging pipe 3 of the crystallization module 1a of the set upstream by one instead of the raw material liquid supply unit 11 and from which precipitated crystals have been removed is supplied as the raw material liquid 101. It is possible to reduce a target substance loss by repeatedly performing continuous crystallization on the raw material liquid 101.

In a case where the purity of the crystals of the target substance collected in the downstream-side crystallization module 1b is low in the above-described serial connection-type crystallization apparatus, high-purity crystals may be collected in the upstream-side crystallization module 1a by the concentration of the target substance being increased by re-dissolution of the crystals in the raw material liquid 101 in the raw material liquid tank 114 of the upstream-side crystallization module 1a.

In addition, the number of sets of the crystallization modules connected in series is not limited to two and may be three or more.

FIG. 6 is a configuration example of a crystallization apparatus provided with the cooling unit 32 cooling the mixed liquid flowing in the aging pipe 3. The cooling unit 32 of this example is configured as a cylindrical cooling pipe through which cooling water flows and the aging pipe 3 is wound around the outer surface of the cylinder. By the temperature of the mixed liquid being lowered, the solubility of the target substance is lowered, and thus more crystals can be collected. It should be noted that the cooling unit is not limited to the case where the cooling unit is provided on the aging pipe 3 side. For example, the mixed liquid may be cooled at the outlet side part of the treatment container 2.

Figure 7:
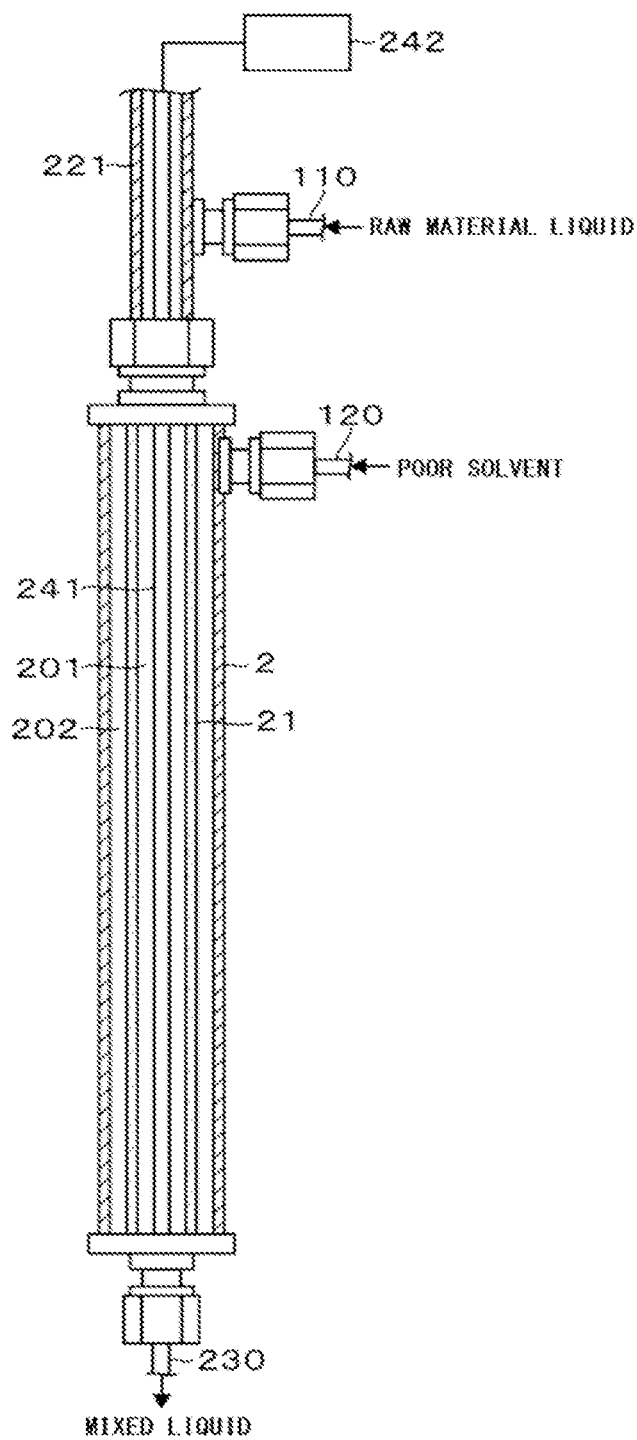
FIG. 7 is a vertical cross-sectional side view of a treatment container including an ultrasonic vibrator for mixing promotion.

FIG. 7 is a configuration example of the treatment container 2 that includes an ultrasonic supply unit 242 supplying ultrasonic vibration via a rod-shaped ultrasonic vibrator 241 inserted in the first flow space 201. Mixing of the raw material liquid 101 and the poor solvent 102 can be promoted by means of the ultrasonic vibration. The ultrasonic supply unit 242 and the ultrasonic vibrator 241 correspond to the mixing promotion unit of this example.

Here, the configuration example of the mixing promotion unit is not limited to the examples of the ultrasonic vibrator 241 and the ultrasonic supply unit 242. For example, a line mixer or a small stirrer may be disposed along the flow direction of the mixed liquid in the first flow space 201.

It should be noted that description of the exhaust unit 22 is omitted in relation to the treatment container 2, a treatment container 2a, and a treatment container 2b illustrated in FIGS. 7 to 10. However, it is a matter of course that the exhaust unit 22 may be provided with respect to the treatment containers 2, 2a, and 2b.

Figure 3:
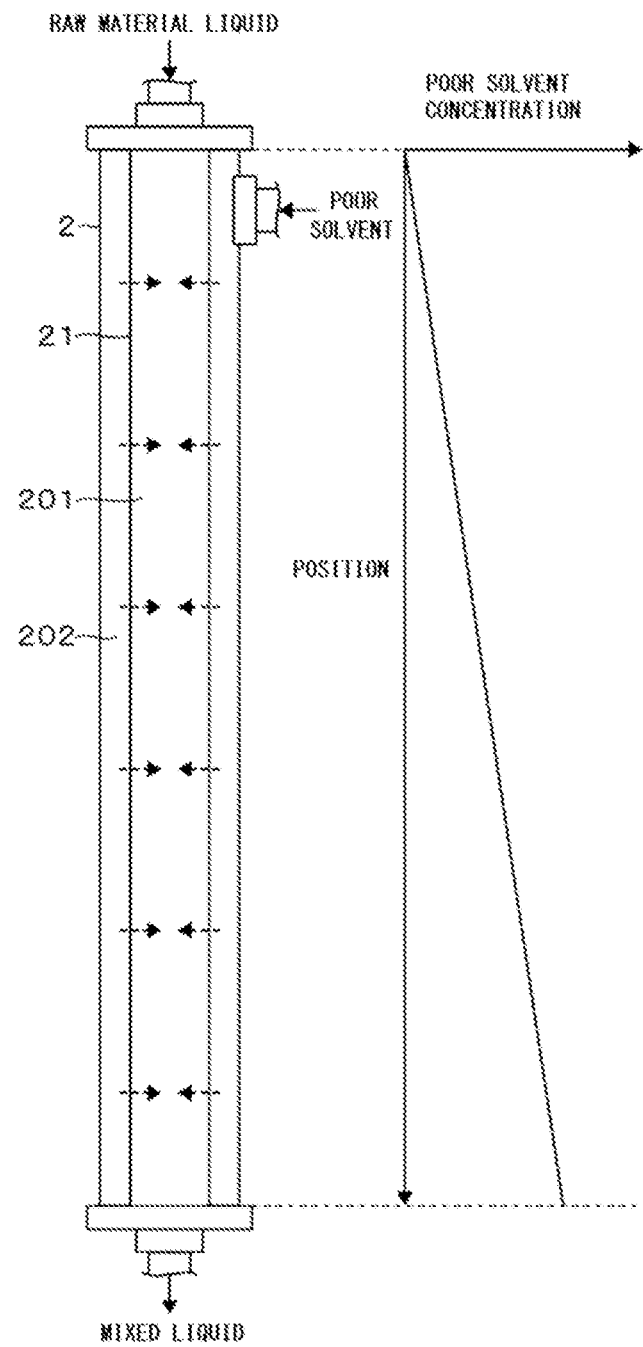
FIG. 3 is an action diagram of the treatment container.
Figure 8:
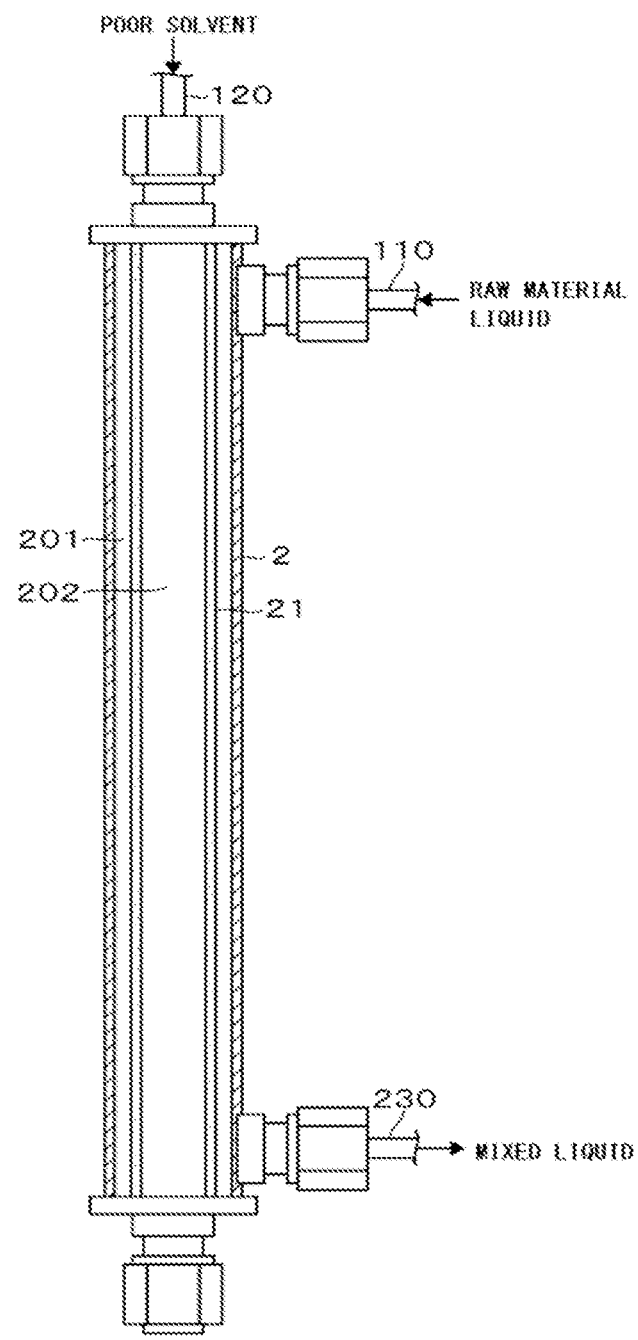
FIG. 8 is a vertical cross-sectional side view of a treatment container according to a first modification example.

FIG. 8 is an example in which the internal and external disposition relationship between the first flow space 201 and the second flow space 202 in the treatment container 2 illustrated in FIG. 3 is reversed. In other words, in this configuration, the second flow space 202 to which the poor solvent 102 is supplied is formed inside the porous membrane 21 and the first flow space 201 to which the raw material liquid 101 is supplied is formed between the porous membrane 21 and the treatment container 2. In this example, the lower end side of the first flow space 201 is sealed and the mixed liquid is extracted from the extraction line 230 connected to the side surface on the lower portion side of the treatment container 2.

Figure 9:
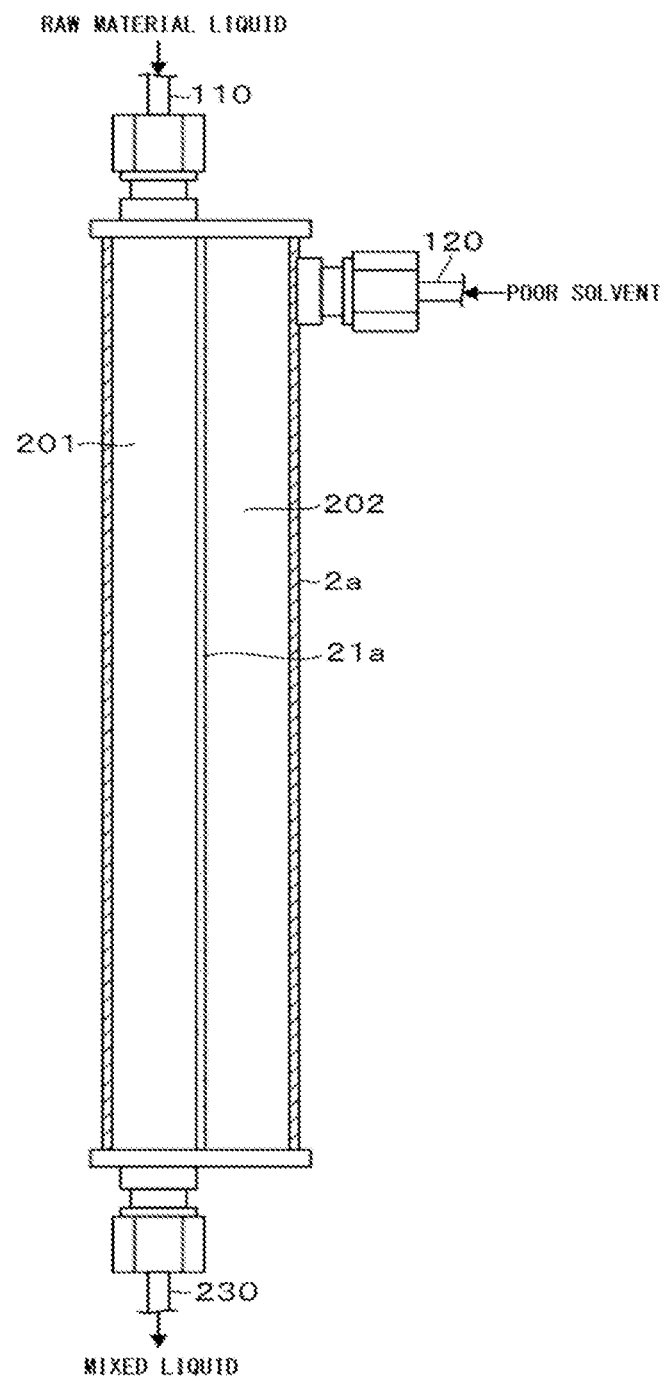
FIG. 9 is a vertical cross-sectional side view of a treatment container according to a second modification example.

FIG. 9 illustrates a configuration example of the treatment container 2a in which the first flow space 201 and the second flow space 202 are partitioned by means of a flat plate-shaped porous membrane 21a. For example, an example is conceivable in which the inner portion of the plate-shaped treatment container 2a having a hollow inner portion is partitioned by the single porous membrane 21a as illustrated in the vertical cross-sectional side view of FIG. 9.

Figure 10:
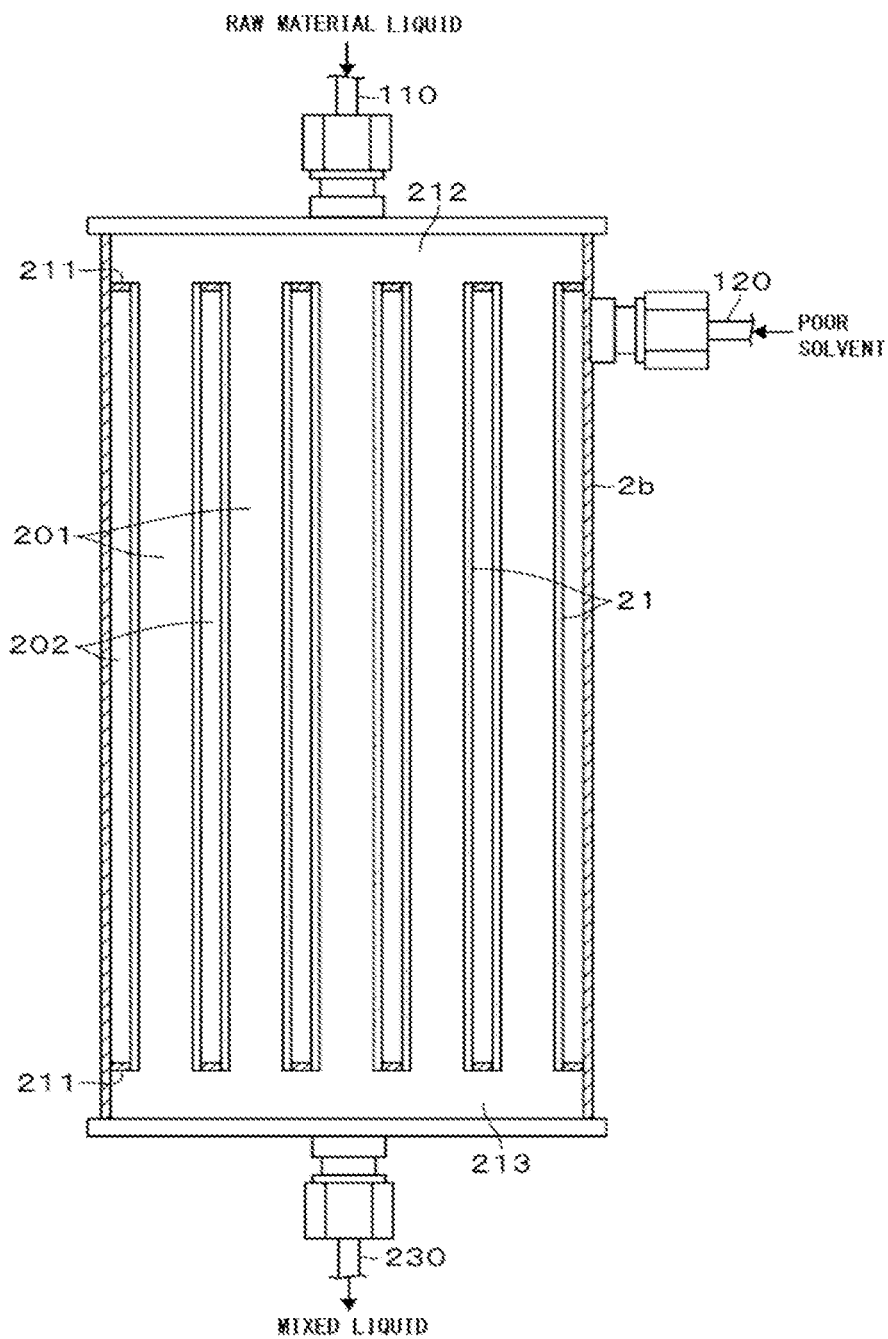
FIG. 10 is a vertical cross-sectional side view of a treatment container according to a third modification example.

FIG. 10 is an example in which a plurality of the first flow spaces 201 and a plurality of the second flow spaces 202 outside the plurality of first flow spaces 201 are configured by a plurality of the pipe-shaped porous membranes 21 being disposed in the treatment container 2b. Each porous membrane 21 has a terminal end portion connected to a fixed pipe plate 211, and a space 212 where the raw material liquid 101 flows into the treatment container 2b and the second flow space 202 and a space 213 where the mixed liquid flows out of the treatment container 2b are partitioned by the fixed pipe plate 211.

A poor solvent containing fine crystals of a target substance capable of passing through pores of a porous membrane to be used may be used for each of the crystallization apparatuses and the treatment containers 2, 2a, and 2b described above. In addition, each of the crystallization apparatuses and the treatment containers 2, 2a, and 2b described above are also applicable to a technique for continuously performing reactive crystallization for precipitating crystals of a target substance by mixing a raw material liquid containing a raw material substance with a reaction liquid generating a target substance that is lower in solubility by reacting with the raw material substance.

EXAMPLES

Example 1 and Comparative Example 1

Continuous crystallization was performed by means of the crystallization apparatus described with reference to FIGS. 1 to 3 and by mixing between ethanol as a poor solvent and a saline solution-ethanol mixed liquid as a raw material liquid.

A. Experimental Conditions

Example 1

The porous membrane 21 made of porous ceramics and having an inner diameter of 9 mm, a length of 250 mm, and an average pore diameter of 1 μm was disposed in the treatment container 2 including a stainless steel pipe body having an inner diameter of 17.5 mm and a length of 296 mm. The aging pipe 3 including a transparent vinyl pipe having an inner diameter of 6 mm and a length of 5 m was disposed in the latter stage of the treatment container 2. It should be noted that an exhaust pipe (not illustrated) instead of the exhaust unit 22 illustrated in FIG. 1 was connected to the side surface on the upper portion side of the treatment container 2 in the crystallization apparatus used in the experiment and the exhaust pipe includes a pressure gauge for exhaust pressure monitoring and an opening-closing valve for exhaust operation.

7.5 L of purified water was mixed with 7.5 L of ethanol having a purity of 99.5 wt %, 2 kg of salt was added, stirring and mixing were performed, and then a supernatant was obtained by the mixture being left as it is for 24 hours. The supernatant was used as the raw material liquid 101. In addition, ethanol having a purity of 99.5 wt % was used as the poor solvent 102.

The raw material liquid 101 was supplied to the first flow space 201 of the treatment container 2 at a flow rate of 40 mL per minute, and the poor solvent 102 was supplied to the second flow space 202 at a flow rate of 3.2 mL per minute. Then, the precipitation and growth of salt crystals in the obtained mixed liquid was observed visually and photomicrographically.

Comparative Example 1

The liquids 101 and 102 were mixed under the same conditions as in Example 1 except that the raw material liquid 101 and the poor solvent 102 were supplied to a stainless steel pipe body lacking the porous membrane 21 made of porous ceramics.

B. Result of Experiment

Figure 11A:
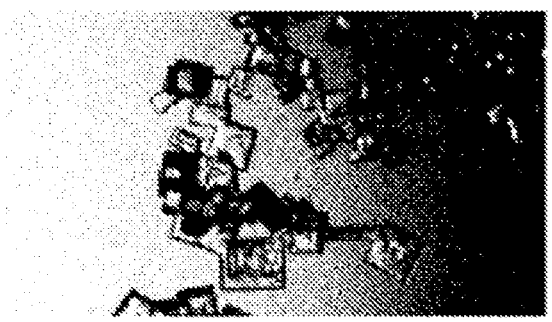
FIGS. 11A, 11B, and 11C are photomicrographs showing the result of continuous salt crystallization from a saline solution-ethanol mixed liquid.
Figure 11B:
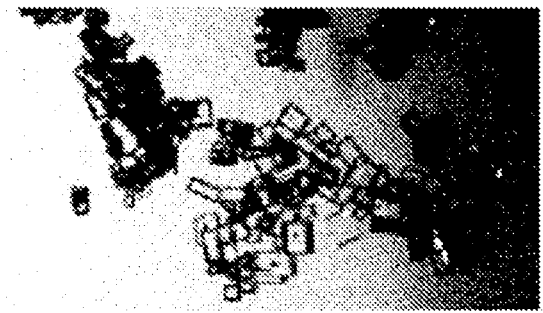
Figure 11C:
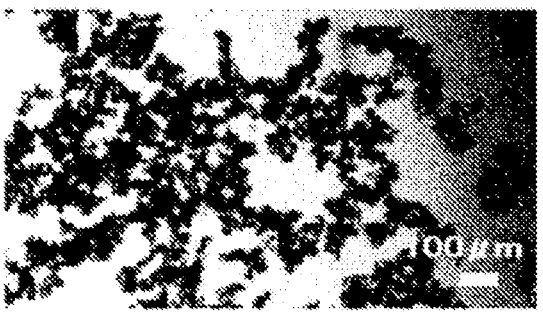

According to the result of the example, the mixed liquid of the raw material liquid 101 and the poor solvent 102 flowed out of the treatment container 2 and the mixed liquid flowed into the aging pipe 3 without blocking the needle valve 232 provided on the outlet side of the treatment container 2 for a long time. Meanwhile, the inner portion of the transparent aging pipe 3 was visually observed. As a result, it was possible to observe how salt crystals flowed while gradually becoming large (growing). The needle valve 232 was blocked 115 minutes after the initiation of the supply of each of the liquids 101 and 102, and the experiment was finished with the pressure of the pressure gauge 231 risen. FIGS. 11(a) to 11(c) are photomicrographs of salt crystals in the mixed liquid collected 15 minutes, 65 minutes, and 115 minutes after the initiation of the supply of the liquids 101 and 102, respectively. It could be confirmed that crystals having a crystal diameter of approximately 100 μm were obtainable.

On the other hand, in the experiment according to the comparative example, crystals were generated immediately after the initiation of the supply of the raw material liquid 101 and the poor solvent 102, the treatment container 2 itself was blocked, and it was impossible to continue with the experiment.

According to the result of the example and the comparative example described above, it is possible to realize continuous crystallization while suppressing blocking of a flow path attributable to crystal precipitation by mixing the raw material liquid 101 and the poor solvent 102 by means of the porous membrane 21.

Example 2

Continuous crystallization was performed by means of the crystallization apparatus illustrated in FIG. 12, which is a modification of the crystallization apparatus described with reference to FIGS. 1 to 3, and by water as a poor solvent being mixed with an acetaminophen-water-isopropyl alcohol (IPA) mixed liquid as a raw material liquid.

A. Experimental Conditions

Figure 12:
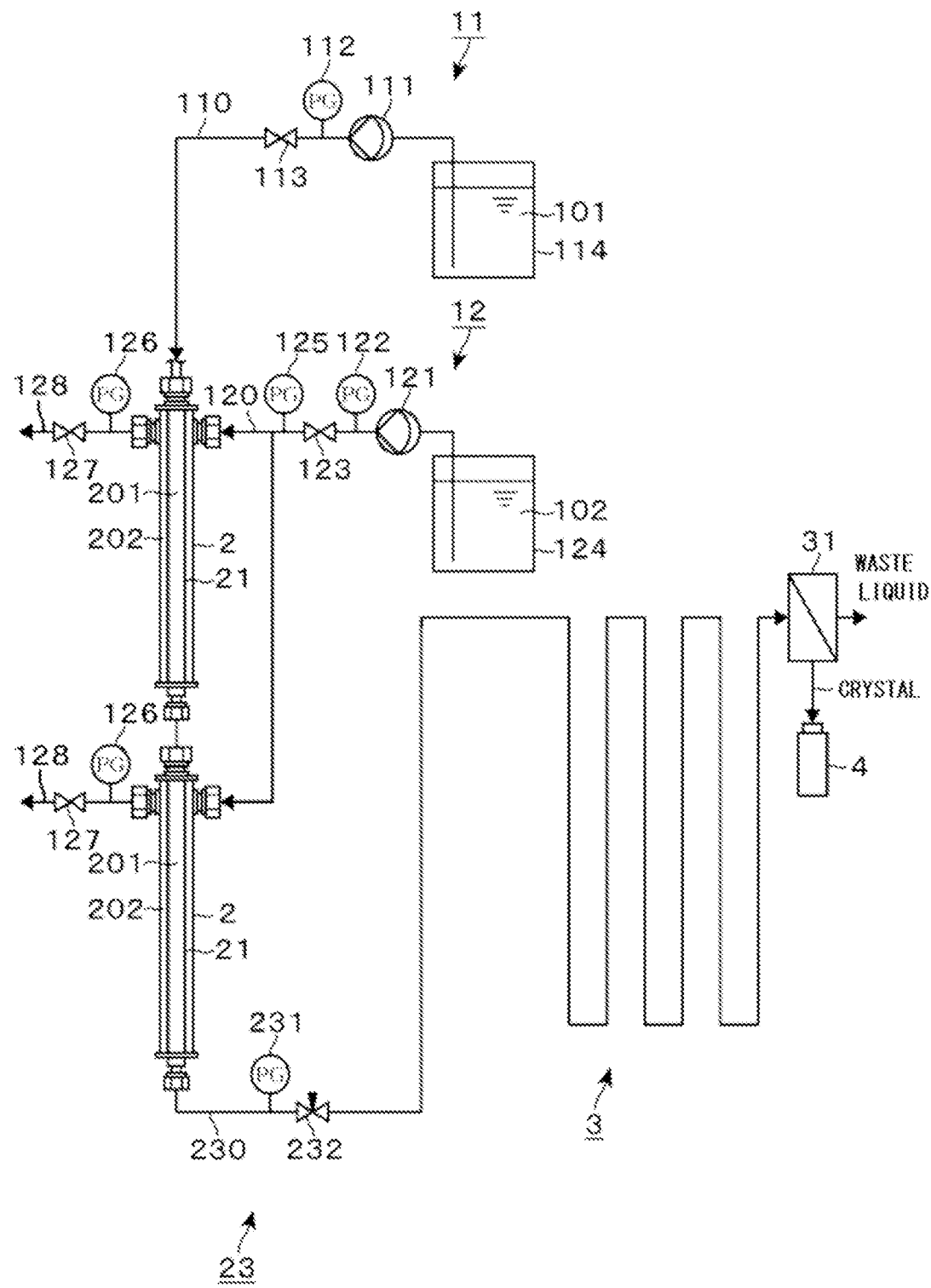
FIG. 12 is a configuration diagram of a crystallization apparatus used for continuous acetaminophen crystallization from an acetaminophen-water-IPA mixed liquid.

The porous membrane 21 made of porous ceramics and having an inner diameter of 9 mm, a length of 250 mm, and an average pore diameter of 1 μm was disposed in the treatment container 2 including a stainless steel pipe body having an inner diameter of 17.5 mm and a length of 296 mm, two units of the disposition were prepared, and the two units were connected in series (FIG. 12). The aging pipe 3 including a transparent vinyl pipe having an inner diameter of 6 mm and a length of 25 m was disposed in the latter stage of the treatment container 2 of the second unit. It should be noted that an exhaust pipe 128 instead of the exhaust unit 22 illustrated in FIG. 1 was connected to the side surface on the upper portion side of the treatment container 2, as illustrated in FIG. 12, in the crystallization apparatus used in the experiment and the exhaust pipe 128 includes a pressure gauge 126 for exhaust pressure monitoring and an opening-closing valve 127 for exhaust operation.

1.25 L of purified water was mixed with 1.25 L of IPA having a purity of 99.7 wt %, 569 g of acetaminophen was added, stirring and mixing were performed, and then a supernatant was obtained by the mixture being left as it is for 24 hours. The supernatant was used as the raw material liquid 101. In addition, purified water was used as the poor solvent 102.

The raw material liquid 101 was supplied to the first flow space 201 of the treatment container 2 at a flow rate of 10 mL per minute, and the poor solvent 102 was supplied to the second flow space 202 at a flow rate of 15 mL per minute. Then, the precipitation and growth of acetaminophen crystals in the obtained mixed liquid was observed visually and photomicrographically.

B. Result of Experiment

Figure 13:
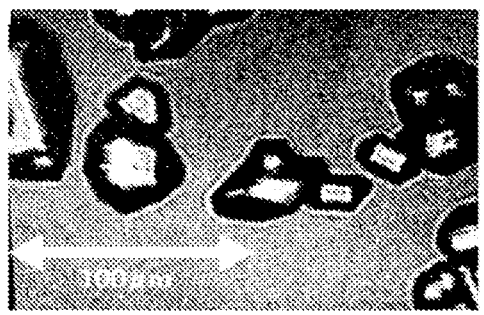
FIG. 13 is a photomicrograph showing the result of the continuous acetaminophen crystallization.

According to the result of the example, the mixed liquid of the raw material liquid 101 and the poor solvent 102 flowed out of the treatment container 2 and the mixed liquid flowed into the aging pipe 3 without blocking the needle valve 232 provided on the outlet side of the treatment container 2 for a long time. Meanwhile, the inner portion of the transparent aging pipe 3 was visually observed. Nevertheless, no acetaminophen crystals could be observed. A solution was collected by sampling being performed at the outlet of the aging pipe 3 60 minutes after the initiation of the supply of each of the liquids 101 and 102. As a result of the microscopical observation of the collected solution, it was observed that crystals of approximately 20 microns were contained. This experiment continued for approximately 4 hours until the raw material was used up, and a solution was collected by regular sampling at the outlet of the aging pipe 3. The collected solution was microscopically observed, and it was continuously observed that crystals of approximately 20 microns were contained. FIG. 13 shows a photograph of acetaminophen crystals contained in the solution sampled at the outlet of the aging pipe 3.

REFERENCE SIGNS LIST 1a, 1b Crystallization module
101 Raw material liquid
102 Poor solvent
11 Raw material liquid supply unit
12 Poor solvent supply unit
2, 2a, 2b Treatment container
201 First flow space
202 Second flow space
21, 21a Porous membrane
3 Aging pipe

The invention claimed is:
1. A crystallization apparatus comprising:
a treatment container where treatment for precipitating a crystal of a target substance is performed;

a porous membrane provided so as to internally partition the treatment container into a first flow space and a second flow space, multiple pores through which a liquid passes being formed in the porous membrane;

a raw material liquid supply unit continuously supplying the first flow space with a raw material liquid containing the target substance or a raw material substance as a raw material of the target substance;

a treatment liquid supply unit continuously supplying a treatment liquid to the second flow space at a pressure at which the treatment liquid passes through the porous membrane and enters the first flow space, the treatment liquid being a poor solvent lowering solubility of the target substance with respect to a mixed liquid obtained by mixing with the raw material liquid or a reaction liquid generating a target substance lower in solubility with respect to the mixed liquid than the raw material substance by reacting with the raw material substance;

an extraction unit continuously extracting a mixed liquid of the raw material liquid and the treatment liquid from the first flow space; and an aging unit precipitating and growing a crystal of the target substance from a mixed liquid extracted from the extraction unit, wherein each of the raw material liquid supply unit and the treatment liquid supply unit is provided at a position where the raw material liquid or the treatment liquid is supplied from a lower portion side of the treatment container and the extraction unit is provided at a position where the mixed liquid is extracted from an upper portion side of the treatment container; and wherein the crystallization apparatus further comprises:

a gas-liquid separation unit provided at a position higher than the first flow space and the second flow space and including a container for collecting an air bubble brought in together with the raw material liquid or treatment liquid and separating the air bubble from a liquid;

a sensor unit detecting a height of an interface between a liquid and a gas pool formed by an air bubble being separated from a liquid in the gas-liquid separation unit; and an exhaust unit discharging gas of the gas pool in a case where an interface height detected by the sensor unit is equal to or lower than a preset interface height.

2. The crystallization apparatus according to claim 1, wherein the aging unit includes a pipeline allowing a mixed liquid extracted from the extraction unit to flow.

3. The crystallization apparatus according to claim 1, wherein the treatment container provided with the porous membrane, a source of raw material liquid, the treatment liquid supply unit, the extraction unit, and the aging unit form a crystallization module, the crystallization apparatus comprising a plurality of crystallization modules connected in series, and wherein for a first crystallization module among the serially-connected plurality of crystallization modules the raw material liquid supply unit is the source of raw material liquid, and wherein, other than for a last crystallization module among the serially-connected plurality of crystallization modules, a mixed liquid flowing out of the aging unit of each one crystallization module among the serially-connected plurality of crystallization modules is supplied as the raw material liquid to a next crystallization module among the serially-connected plurality of crystallization modules, said mixed liquid supplied as the raw material liquid having had a precipitated crystal removed in the aging unit of said one crystallization module.

4. The crystallization apparatus according to claim 1, comprising a cooling unit cooling the mixed liquid.

5. The crystallization apparatus according to claim 4, wherein the cooling unit is provided in the aging unit.

6. The crystallization apparatus according to claim 1, comprising a mixing promotion unit promoting mixing of a mixed liquid flowing in the first flow space.

7. The crystallization apparatus according to claim 1, wherein the poor solvent contains a fine crystal of the target substance capable of passing through a pore of the porous membrane.

8. The crystallization apparatus according to claim 1, wherein the raw material liquid contains a fine crystal of the target substance.

9. A crystallization apparatus comprising:

a treatment container where treatment for precipitating a crystal of a target substance is performed;

a straight pipe-shaped porous membrane (excluding a hollow fiber membrane) provided so as to internally partition the treatment container into a first flow space and a second flow space, multiple pores through which a liquid passes being formed in the straight pipe-shaped porous membrane;

a raw material liquid supply unit continuously supplying the first flow space with a raw material liquid containing the target substance or a raw material substance as a raw material of the target substance;

a treatment liquid supply unit continuously supplying a treatment liquid to the second flow space at a pressure at which the treatment liquid passes through the porous membrane and enters the first flow space, the treatment liquid being a poor solvent lowering solubility of the target substance with respect to a mixed liquid obtained by mixing with the raw material liquid or a reaction liquid generating a target substance lower in solubility with respect to the mixed liquid than the raw material substance by reacting with the raw material substance;

an extraction unit continuously extracting a mixed liquid of the raw material liquid and the treatment liquid from the first flow space; and an aging unit precipitating and growing a crystal of the target substance from a mixed liquid extracted from the extraction unit.

10. The crystallization apparatus according to claim 9, further comprising:

a solid-liquid separation unit including an agitator and a filter; and wherein the aging unit includes a pipeline allowing a mixed liquid extracted from the extraction unit to flow;

wherein the pipeline extends between the extraction unit and the solid-liquid separation unit for a length configured so that induction time for at least a subset of crystals results in the subset of crystals being precipitated and grown in the pipeline as the mixed liquid flows through the pipeline; and wherein the solid-liquid separation unit is connected to the pipeline of the aging unit so as to receive the mixed liquid from the pipeline, the solid-liquid separation unit configured to separate the mixed liquid into crystals and waste liquid.

11. The crystallization apparatus according to claim 9, wherein an internal space of the treatment container is formed extending along the vertical direction, and the raw material liquid supply unit is connected to a position where the raw material liquid is supplied from an upper portion side of the first flow space, the treatment liquid supply unit is connected to a position where the treatment liquid is supplied from an upper end portion side of the second flow space, and the extraction unit is connected to a position where the mixed liquid is extracted from a lower portion side of the first flow space.

12. The crystallization apparatus according to claim 9, comprising:

a gas-liquid separation unit provided at a position higher than the first flow space and the second flow space and including a container for collecting an air bubble brought in together with the raw material liquid or treatment liquid and separating the air bubble from a liquid;

a sensor unit detecting a height of an interface between a liquid and a gas pool formed by an air bubble being separated from a liquid in the gas-liquid separation unit; and an exhaust unit discharging gas of the gas pool in a case where an interface height detected by the sensor unit is equal to or lower than a preset interface height.

13. The crystallization apparatus according to claim 9, wherein the treatment container provided with the porous membrane, a source of raw material liquid, the treatment liquid supply unit, the extraction unit, and the aging unit form a crystallization module, the crystallization apparatus comprising a plurality of crystallization modules connected in series, and wherein for a first crystallization module among the serially-connected plurality of crystallization modules the raw material liquid supply unit is the source of raw material liquid, and wherein, other than for a last crystallization module among the serially-connected plurality of crystallization modules, a mixed liquid flowing out of the aging unit of each one crystallization module among the serially-connected plurality of crystallization modules is supplied as the raw material liquid to a next crystallization module among the serially-connected plurality of crystallization modules, said mixed liquid supplied as the raw material liquid having had a precipitated crystal removed in the aging unit of said one crystallization module.

14. The crystallization apparatus according to claim 9, comprising a cooling unit cooling the mixed liquid.

15. The crystallization apparatus according to claim 14, wherein the cooling unit is provided in the aging unit.

16. The crystallization apparatus according to claim 9, comprising a mixing promotion unit promoting mixing of a mixed liquid flowing in the first flow space.

17. The crystallization apparatus according to claim 9, wherein the poor solvent contains a fine crystal of the target substance capable of passing through a pore of the porous membrane.

18. The crystallization apparatus according to claim 9, wherein the raw material liquid contains a fine crystal of the target substance.

19. A crystallization apparatus comprising:

a treatment container where treatment for precipitating a crystal of a target substance is performed;

a porous membrane provided so as to internally partition the treatment container into a first flow space and a second flow space, multiple pores through which a liquid passes being formed in the porous membrane;

a raw material liquid supply unit continuously supplying the first flow space with a raw material liquid containing a raw material substance as a raw material of the target substance;

a treatment liquid supply unit continuously supplying a treatment liquid to the second flow space at a pressure at which the treatment liquid passes through the porous membrane and enters the first flow space, the treatment liquid being a reaction liquid generating a target substance lower in solubility with respect to the mixed liquid than the raw material substance by reacting with the raw material substance;

an extraction unit continuously extracting a mixed liquid of the raw material liquid and the treatment liquid from the first flow space; and an aging unit precipitating and growing a crystal of the target substance from a mixed liquid extracted from the extraction unit; and wherein the crystallization apparatus further comprises:

a gas-liquid separation unit provided at a position higher than the first flow space and the second flow space and including a container for collecting an air bubble brought in together with the raw material liquid or treatment liquid and separating the air bubble from a liquid;

a sensor unit detecting a height of an interface between a liquid and a gas pool formed by an air bubble being separated from a liquid in the gas-liquid separation unit; and an exhaust unit discharging gas of the gas pool in a case where an interface height detected by the sensor unit is equal to or lower than a preset interface height.

20. The crystallization apparatus according to claim 19, wherein the aging unit includes a pipeline allowing a mixed liquid extracted from the extraction unit to flow.

21. The crystallization apparatus according to claim 19, wherein each of the raw material liquid supply unit and the treatment liquid supply unit is provided at a position where the raw material liquid or the treatment liquid is supplied from an upper portion side of the treatment container and the extraction unit is provided at a position where the mixed liquid is extracted from a lower portion side of the treatment container.

22. The crystallization apparatus according to claim 19, wherein the treatment container provided with the porous membrane, a source of raw material liquid, the treatment liquid supply unit, the extraction unit, and the aging unit form a crystallization module, the crystallization apparatus comprising a plurality of crystallization modules connected in series, and wherein for a first crystallization module among the serially-connected plurality of crystallization modules the raw material liquid supply unit is the source of raw material liquid, and wherein, other than for a last crystallization module among the serially-connected plurality of crystallization modules, a mixed liquid flowing out of the aging unit of each one crystallization module among the serially-connected plurality of crystallization modules is supplied as the raw material liquid to a next crystallization module among the serially-connected plurality of crystallization modules, said mixed liquid supplied as the raw material liquid having had a precipitated crystal removed in the aging unit of said one crystallization module.

23. The crystallization apparatus according to claim 19, comprising a cooling unit cooling the mixed liquid.

24. The crystallization apparatus according to claim 23, wherein the cooling unit is provided in the aging unit.

25. The crystallization apparatus according to claim 19, comprising a mixing promotion unit promoting mixing of a mixed liquid flowing in the first flow space.

26. The crystallization apparatus according to claim 19, wherein the raw material liquid contains a fine crystal of the target substance.

* * * * *